(12) United States Patent
Vassilieva et al.

(10) Patent No.: US 8,543,000 B2
(45) Date of Patent: Sep. 24, 2013

(54) SYSTEM AND METHOD FOR REDUCING POLARIZATION DEPENDENT LOSS CROSS-TALK EFFECTS

(75) Inventors: Olga I Vassilieva, Plano, TX (US); Inwoong Kim, Allen, TX (US)

(73) Assignee: Fujitsu Limited, Kawasaki-shi (JP)

( * ) Notice: Subject to any disclaimer, the term of this patent is extended or adjusted under 35 U.S.C. 154(b) by 321 days.

(21) Appl. No.: 12/879,792

(22) Filed: Sep. 10, 2010

(65) Prior Publication Data
US 2012/0063781 A1 Mar. 15, 2012

(51) Int. Cl.
*H04J 14/02* (2006.01)
(52) U.S. Cl.
USPC ............... 398/81; 398/159; 398/147; 398/65; 398/152
(58) Field of Classification Search
USPC ............... 398/81, 79, 147, 148, 149, 152, 65, 398/158, 159, 160, 161, 183, 184, 185, 188
See application file for complete search history.

(56) References Cited

U.S. PATENT DOCUMENTS

| 6,819,872 B2 * | 11/2004 | Farries et al. ................. 398/102 |
| 8,270,835 B2 * | 9/2012 | Croussore et al. .............. 398/81 |
| 8,270,847 B2 * | 9/2012 | Zhang et al. .................. 398/183 |
| 2009/0274469 A1 | 11/2009 | Yuki et al. .................... 398/152 |

OTHER PUBLICATIONS

Chongjin Xie; "Interchannel Nonlinearities in Coherent Polarization-Division-Multiplexed Quadrature-Phase-Shift-Keying Systems"; IEEE Photonics Technology Letters, vol. 21, No. 5; pp. 274-276, Mar. 1, 2009.
Agilent Technologies; "Agilent 8169A Polarization Controller"; Technical Specifications; pp. 6, Dec. 2004.
OZ Optics; "Electrically Driven Polarization Controller-Scrambler"; www.ozoptics.com; pp. 4, Mar. 19, 2010.

* cited by examiner

*Primary Examiner* — Hanh Phan
(74) *Attorney, Agent, or Firm* — Baker Botts L.L.P.

(57) ABSTRACT

In accordance with the present disclosure a system for reducing polarization dependent loss (PDL) of an optical signal comprises a delay module coupled to one or more PDL inducing network elements of an optical network. The delay module is configured to time interleave a first polarization component with respect to a second polarization component of the optical signal. The time interleaving reduces interference caused by cross-talk components associated with the first and second polarization components and induced by the PDL of the PDL inducing elements.

14 Claims, 8 Drawing Sheets

SYSTEM AND METHOD FOR REDUCING POLARIZATION DEPENDENT LOSS CROSS-TALK EFFECTS

TECHNICAL FIELD

The present disclosure relates generally to optical communication networks and, more particularly, to a system for compensating for the effects of polarization dependent loss in a system.

BACKGROUND

Telecommunications systems, cable television systems and data communication networks use optical networks to rapidly convey large amounts of information between remote points. In an optical network, information is conveyed in the form of optical signals through optical fibers. Optical networks may also include various network elements such as amplifiers, dispersion compensators, multiplexer/demultiplexer filters, wavelength selective switches, couplers, etc. configured to perform various operations within the network.

However, each of these network elements may also introduce polarization dependent effects on the signals traveling through the network. These effects may cause the various components of the polarization states of the signals to experience varying degrees of loss or gain, thus causing unequal power levels of the various polarization components of the signals. This inequality of power may cause information or data carried by the signals to become distorted or lost.

SUMMARY

In accordance with the present disclosure, disadvantages and problems associated with polarization dependent loss may be reduced. In accordance with the present disclosure a system for reducing polarization dependent loss (PDL) of an optical signal comprises a delay module coupled to one or more PDL inducing network elements of an optical network. The delay module is configured to time interleave a first polarization component with respect to a second polarization component of the optical signal. The time interleaving reduces interference caused by cross-talk components associated with the first and second polarization components and induced by the PDL of the PDL inducing elements.

In accordance with another embodiment of the present disclosure a method for reducing polarization dependent loss (PDL) of an optical signal comprises delaying, by a delay module, a first polarization component with respect to a second polarization component to time interleave the first polarization component with respect to the second polarization component. The time interleaving reduces interference caused by cross-talk components associated with the first and second polarization components and induced by the PDL of the PDL inducing elements.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
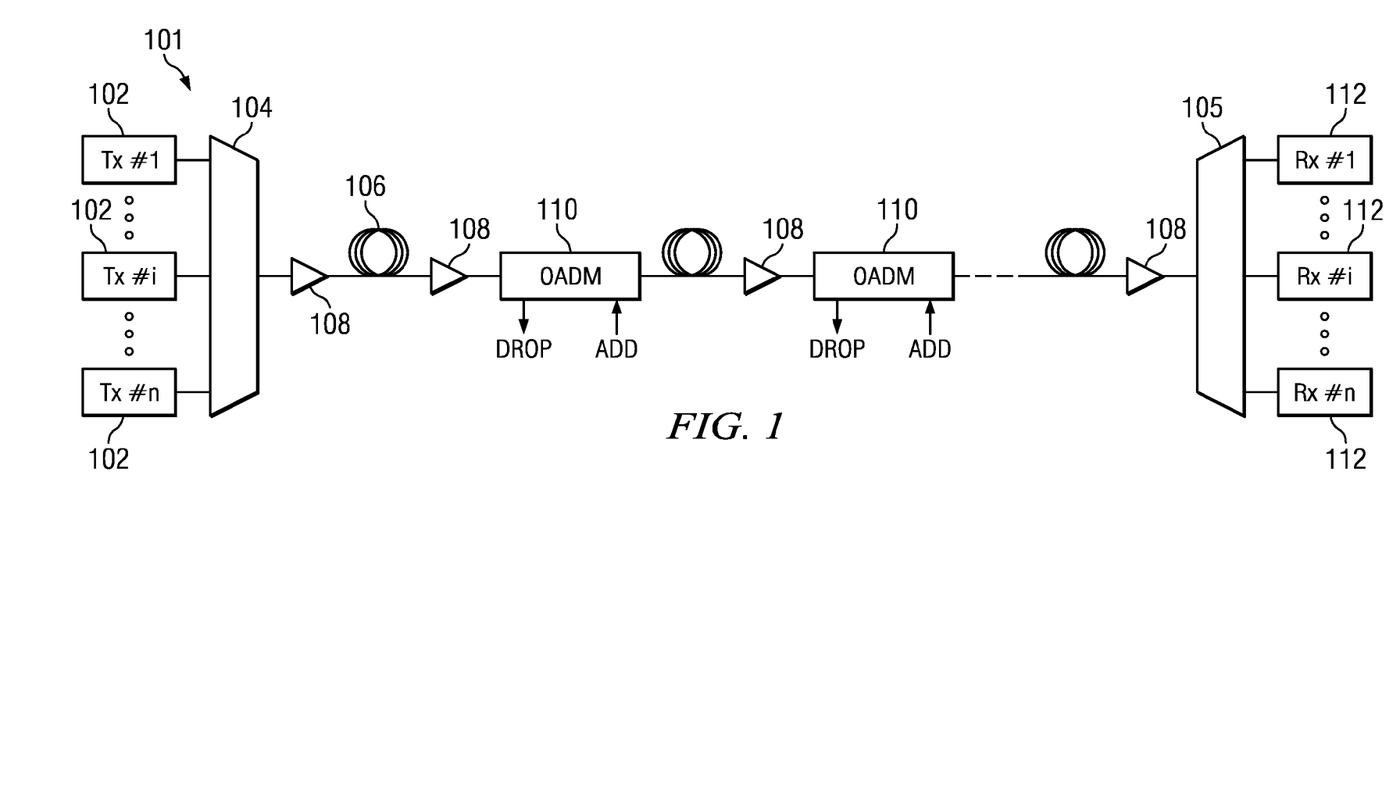
FIG. 1 illustrates an example embodiment of an optical network.

FIG. 1 illustrates an example embodiment of an optical network 101. Optical network 101 may include one or more optical fibers 106 configured to transport one or more optical signals communicated by components of optical network 101. The network elements of optical network 101, coupled together by fibers 106, may comprise one or more transmitters 102, one or more multiplexers (MUX) 104, one or more amplifiers 108, one or more optical add/drop multiplexers (OADM) 110, and one or more receivers 112.

Optical network 101 may comprise a point-to-point optical network with terminal nodes, a ring optical network, a mesh optical network, or any other suitable optical network or combination of optical networks. Optical fibers 106 comprise thin strands of glass capable of communicating the signals over long distances with very low loss. Optical fibers 106 may comprise any suitable type of fiber, such as a Single-Mode Fiber (SMF), Enhanced Large Effective Area Fiber (ELEAF), or a TrueWave® Reduced Slope (TW-RS) fiber.

Optical network 101 may include devices configured to transmit optical signals over fibers 106. Information may be transmitted and received through network 101 by modulation of one or more wavelengths of light to encode the information on the wavelength. In optical networking, a wavelength of light may also be referred to as a channel. Each channel may be configured to carry a certain amount of information through optical network 101.

To increase the information carrying capabilities of optical network 101, multiple signals transmitted at multiple channels may be combined into a single optical signal. The process of communicating information at multiple channels of a single optical signal is referred to in optics as wavelength division multiplexing (WDM). Dense wavelength division multiplexing (DWDM) refers to the multiplexing of a larger (denser) number of wavelengths, usually greater than forty, into a fiber. WDM, DWDM, or other multi-wavelength transmission techniques are employed in optical networks to increase the aggregate bandwidth per optical fiber. Without WDM or DWDM, the bandwidth in optical networks may be limited to the bit-rate of solely one wavelength. With more bandwidth, optical networks are capable of transmitting greater amounts of information. Optical network 101 may be configured to transmit disparate channels using WDM, DWDM, or some other suitable multi-channel multiplexing technique, and to amplify the multi-channel signal.

Optical network 101 may include one or more optical transmitters (Tx) 102 configured to transmit optical signals through optical network 101 in specific wavelengths or channels. Transmitters 102 may comprise any system, apparatus or device configured to convert an electrical signal into an optical signal and transmit the optical signal. For example, transmitters 102 may each comprise a laser and a modulator configured to receive electrical signals and modulate the information contained in the electrical signals onto a beam of light produced by the laser at a particular wavelength and transmit the beam carrying the signal throughout the network.

Multiplexer 104 may be coupled to transmitters 102 and may be any system, apparatus or device configured to combine the signals transmitted by transmitters 102, in individual wavelengths, into a single WDM or DWDM signal.

Amplifiers 108 may amplify the multi-channeled signals within network 101. Amplifiers 108 may be positioned before and/or after certain lengths of fiber 106. Amplifiers 108 may comprise any system, apparatus, or device configured to amplify signals. For example, amplifiers 108 may comprise an optical repeater that amplifies the optical signal. This amplification may be performed with opto-electrical or electro-optical conversion. In some embodiments, amplifiers 108 may comprise an optical fiber doped with a rare-earth element. When a signal passes through the fiber, external energy may be applied to excite the atoms of the doped portion of the optical fiber, which increases the intensity of the optical signal. As an example, Amplifiers 108 may comprise an erbium-doped fiber amplifier (EDFA). However, any other suitable amplifier, such as a semiconductor optical amplifier (SOA), may be used.

OADMs 110 may be coupled to network 101 via fibers 106 also. OADMs 110 comprise an add/drop module, which may include any system, apparatus or device configured to add and/or drop optical signals from fibers 106. After passing through an OADM 110, a signal may travel along fibers 106 directly to a destination, or the signal may be passed through one or more additional OADMs 110 before reaching a destination.

Network 101 may also include one or more demultiplexers 105 at one or more destinations of network 101. Demultiplexer 105 may comprise any system apparatus or device that may act as a demultiplexer by splitting a single WDM signal into its individual channels. In some embodiments, demultiplexer 105 may comprise a multiplexer 104 but configured to split WDM signals into their individual channels instead of combine individual channels into one WDM signal. For example, network 101 may transmit and carry a forty channel DWDM signal. Demultiplexer 105 may divide the single, forty channel DWDM signal into forty separate signals according to the forty different channels.

Network 101 may also include receivers 112 coupled to demultiplexer 105. Each receiver 112 may be configured to receive signals transmitted in a particular wavelength or channel, and process the signals for the information that they contain. Accordingly, network 101 may include at least one receiver 112 for every channel of the network.

Modifications, additions or omissions may be made to network 101 without departing from the scope of the disclosure. For example, network 101 may include more or fewer elements than those depicted. Additionally network 101 may include additional elements not expressly shown, such as a dispersion control module. Also, as mentioned above, although depicted as a point to point network, network 101 may comprise any suitable network for transmitting optical signals such as a ring or mesh network.

Figure 2A:
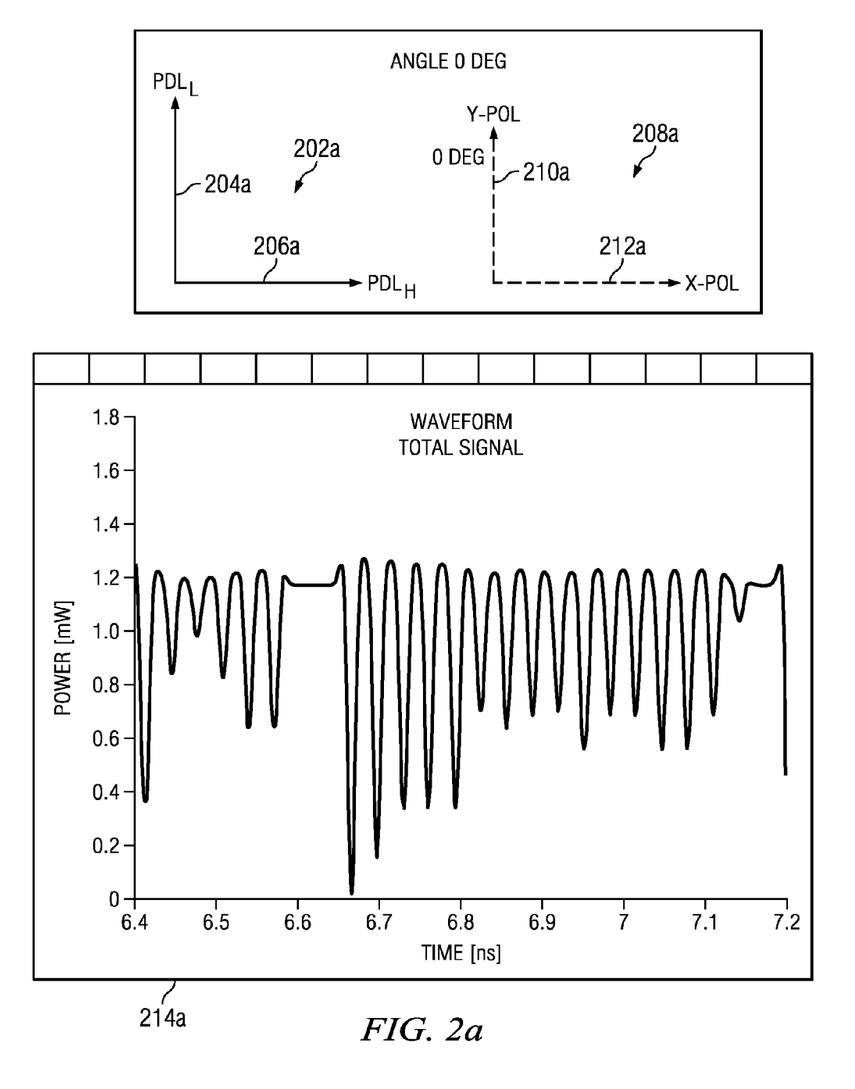
FIG. 2a illustrates the effects of PDL on signals with modulated polarization components substantially aligned with the high and low loss axes of PDL.
Figure 2B:
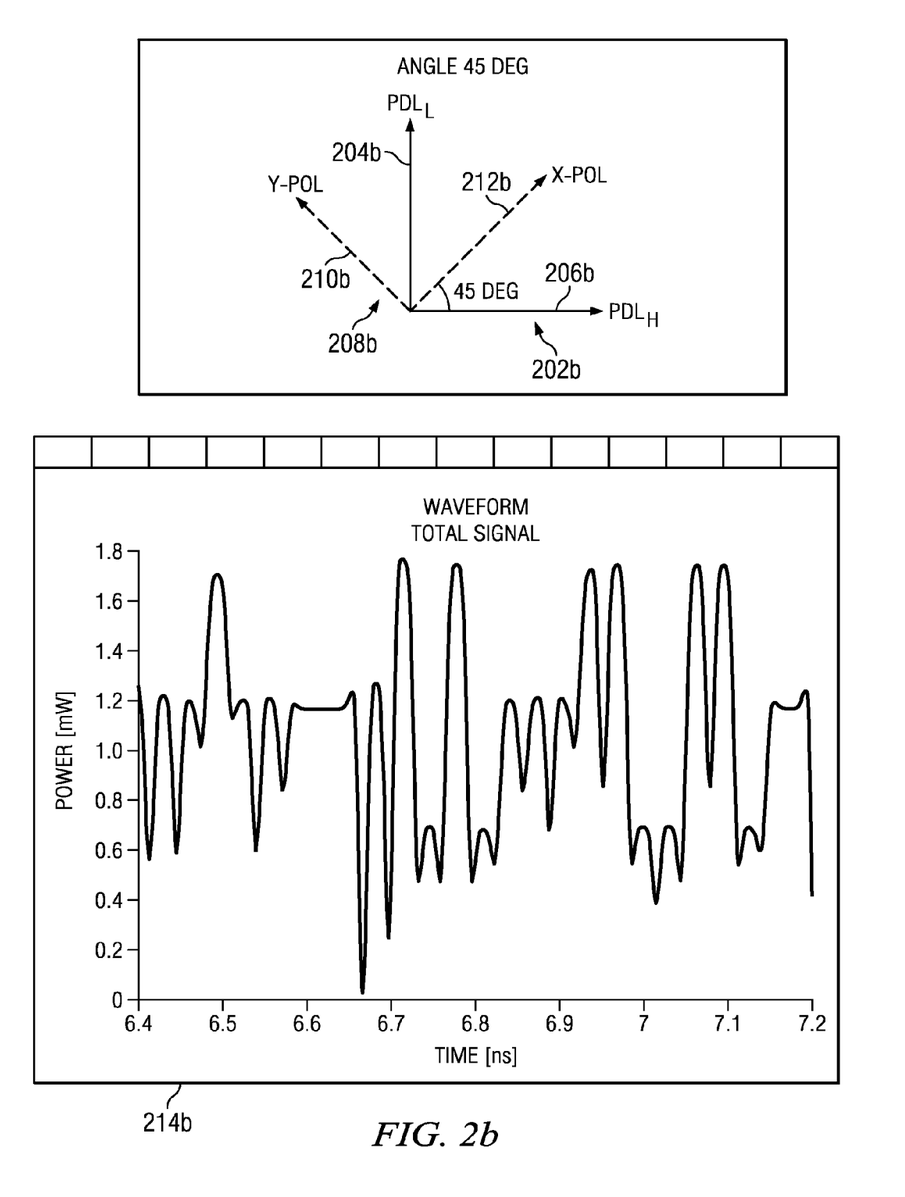
FIG. 2b illustrates the effects of PDL on signals with modulated polarization components oriented approximately forty-five degrees with respect to the high and low axes of the PDL.

FIGS. 2a and 2b illustrate the effects of polarization dependent loss on signals traveling through an optical network, such as network 101.

As discussed above, the amount of information that may be transmitted over an optical network may vary with the number of optical channels coded with information and multiplexed into one signal. Accordingly, an optical signal employing WDM may carry more information than an optical signal carrying information over solely one channel. An optical signal employing DWDM may carry even more information. Besides the number of channels carried, another factor that affects how much information can be transmitted over an optical network may be the bit rate of transmission. The greater the bit rate, the more information may be transmitted.

Polarization division multiplexing (PDM) technology may enable achieving a greater bit rate for information transmission. PDM transmission comprises modulating information onto various polarization components of an optical signal associated with a channel. The polarization of an optical signal may refer to the direction of the oscillations of the optical signal. The term "polarization" may generally refer to the path traced out by the tip of the electric field vector at a point in space, which is perpendicular to the propagation direction of the optical signal. The term "linear polarization' may generally refer to a single direction of the orientation of the electric field vector. Generally, an arbitrary linearly polarized wave can be resolved into two independent orthogonal components labeled x and y, which are in phase with each other. For example, in polarization multiplexed transmission, an optical beam created by a laser may be highly linearly polarized. The beam may be divided by a polarization beam splitter according to the x-polarization component of the beam and the y-polarization component of the beam. Upon being split, the x-polarization component may be aligned with a horizontal axis and the y-polarization component may be aligned with a vertical axis of the beam. It is understood that the terms "horizontal" polarization and "vertical" polarization are merely used to denote a frame of reference for descriptive purposes, and do not relate to any particular polarization orientation.

Following splitting of the beam into the x and y polarization components, information may be modulated onto both beams. Following modulation, both beams may be combined by a polarization beam combiner such that the combined beam comprises an optical signal with two polarization components (e.g., an x-polarization component and a y-polarization component) with information modulated onto each polarization component. Accordingly, by modulating information onto both the y-polarization component and x-polarization component of the signal, the amount of information that may be carried by the channel associated with the signal over any given time may increase (e.g., increasing the bit rate of the channel).

In the present disclosure, it is understood that as signals travel through the network, the state of polarization of the signals may rotate with respect to the frame of reference. Consequently, the modulated x and y polarizations may also be rotated such that the components are no longer aligned with the horizontal axis and the vertical axis of the frame of reference. However, the terms "x-polarization" and "y-polarization" of the signal may still be used to denote the polarization components with information modulated thereon even if the modulated x and y polarization components are no longer oriented with the horizontal and vertical axes of the frame of reference.

The various elements and devices in optical networks may affect the modulated x and y polarization components of each channel associated with the optical signals in different manners. Fibers 106, multiplexers 104, and add/drop modules 110 may attenuate signals as the signals pass through these elements and amplifiers 108 may amplify the signals. These elements may attenuate and amplify the various polarization components of each channel within the signals differently, thus causing a polarization dependent loss (PDL) and a polarization dependent gain (PDG).

For example, a multiplexer 104 may attenuate the modulated y-polarization of a wavelength associated with a channel greater than it may attenuate the modulated x-polarization of the same wavelength. Additionally, the modulated x and y polarizations of one wavelength associated with one channel may be affected differently than the x and y polarization of another wavelength associated with a different channel. Similarly, amplifiers 108 may amplify the modulated x and y polarization components of each channel associated with the optical signals differently. Accordingly, in a multi-polarization WDM signal, each modulated polarization component of each channel may experience varying degrees of gain and loss while passing through an optical network. Although the polarization dependent effects of the various network components may result from both PDL and PDG, the overall result of the effects may be referred to simply as PDL.

As mentioned above, these polarization dependent effects (e.g., PDL) may cause the different modulated polarization components of the polarization multiplexed signals to be amplified and attenuated at varying degrees, which may cause signal distortion and loss of information. The difference between the power of the modulated polarization component experiencing the most loss and the modulated polarization component experiencing the least loss may be a representation of the PDL of the signal as it passes through a network. The difference between the two indicates how the power of one polarization component has been affected by the various elements of the network compared to the power of the other polarization component, and thus may represent the PDL experienced by the signal. This difference may be represented in decibels (dB).

For example, in a dual-polarization signal, the modulated y-polarization may experience more loss than the modulated x-polarization, due to PDL, such that the signal power of the y-polarization is lower than the signal power of the x-polarization. The difference between the x-polarization and the y-polarization may represent the PDL experienced by the signal.

The PDL experienced by a signal depends on the PDL of the network or network element that the signal passes through. The PDL of the network or network elements may include a high loss axis and a low loss axis. The PDL of a network element may be associated with the maximum and minimum attenuation or amplification experienced by all the polarization components of an optical signal as the signal passes through a network element or device. The high loss axis of the PDL may be referred to as the orientation of the polarization that experiences maximum loss and the low loss axis may refer to the orientation of the polarization that experiences minimum loss.

For example, a network element may attenuate polarization components aligned with the horizontal axis of a frame of reference of the optical signals the most and may attenuate polarization components aligned with the vertical axis of the frame of reference the least. Consequently, the high loss axis of the PDL of the network element may correspond with the horizontal axis of an optical signal, and the low loss axis may correspond with the vertical axis of the signal.

Polarization dependent effects experienced by each signal traveling through a network may also vary. Due to switching within networks, different signals may pass through different network elements that may create different polarization dependent effects. Additionally, environmental and physical factors such as bending and moving of fibers may also change the PDL of network elements such that the PDL experienced by signals traveling through a network may also change.

Signal degradation due to PDL may depend on the orientation between the high and low loss axes of the PDL and the signal polarization components modulated with information. FIG. 2a illustrates the effects of PDL on signals with modulated x and y polarization components substantially aligned with the high and low loss axes of PDL.

For example, in FIG. 2a, PDL 202a and a signal 208a are depicted. PDL 202a may represent the polarization dependent loss created by one or more network elements. PDL 202a may include a low loss axis 204a and a high loss axis 206a. Low loss axis 204a may be oriented such that the polarization component of signals oriented with the vertical axis of a frame of reference and passing through the network element associated with PDL 202a are attenuated or amplified the least. Consequently, low loss axis 204a may correspond with the vertical axis of the frame of reference. Additionally, high loss axis 206a may be oriented such that the polarization components of signals oriented with the horizontal axis and passing through the network element associated with PDL 202a are attenuated or amplified the most. Accordingly, high loss axis 206a may correspond with the horizontal axis.

Signal 208a may include a y-polarization component 210a and an x-polarization component 212a. Polarization components 210a and 212a may each be modulated with information or traffic. Y-polarization component 210a may be oriented such that it is substantially aligned with low loss axis 204 and the vertical axis. Additionally, polarization x-component 212a may be oriented such that it is substantially aligned with high loss axis 206a and the horizontal axis.

Graph 214a depicts the average power of a signal, such as signal 208a, over time when y and x polarization components 210a and 212a are aligned with low and high loss axes 204a and 206a. As shown in graph 214a, when y and x polarization components 210a and 212a are approximately aligned with low and high loss axes 204a and 206a, the maximum power of signal 208a may be at a substantially constant level. Thus, the receivers receiving the signals may accurately process the information or data modulated onto the signals.

FIG. 2b illustrates the effects of PDL on signals with modulated polarization components oriented approximately forty-five degrees with respect to the high and low axes of the PDL. In FIG. 2b, PDL 202b may be substantially similar to PDL 202a depicted in FIG. 2a. Accordingly, PDL 202b may include low and high loss axes 204b and 206b that respectively correspond with the vertical and horizontal axes of the frame of reference.

Signal 208b may include modulated y-polarization component 210b and modulated x-polarization component 212b. Modulated y and x polarization components 210b and 212b may be oriented forty-five degrees between the horizontal and vertical axes. Accordingly, modulated polarization components 210b and 212b of signal 208b are oriented at forty-five degrees with respect to low and high loss axes 204b and 206b of PDL 202b—due to low and high loss axes 204b and 206b respectively corresponding with the vertical and horizontal axes.

Graph 214b depicts the average power of a signal, such as signal 208b, over time when modulated polarization components 210b and 212b are oriented at forty-five degrees with respect to the high and low loss axes 206b and 204b of PDL 202b. When polarization components 210b and 212b are oriented at forty-five degrees with respect to high and low axes 206b and 204b, the PDL introduces large data dependent peak-to-peak optical power variations which may result in higher nonlinear phase noise generation. These nonlinear effects may greatly increase the optical signal to noise ratio (OSNR) penalty of signal 208b which may result in an inability to read the information modulated thereon. These large power variations due to the PDL effects may be seen in graph 214b with the many different spikes in maximum power of the signal.

Changes may be made to FIGS. 2a and 2b without departing from the scope of the present disclosure. For example, the orientations depicted are merely for illustrative purposes to depict the relative relationship between the orientations of high and low loss axes of PDL of a network element with respect to the polarization components of an optical signal.

Additionally, although the orientation of the modulated x and y polarization components of signals with respect to the high and low loss axes of the PDL has been described, simple reference to the orientation of signals with respect to PDL without mentioning the polarization components of the signals or the high and low loss axes of the PDL in the present disclosure may connote the same idea. Also, rotation of the polarization of a signal may be referred to simply as the rotation of the signal.

Figure 3:
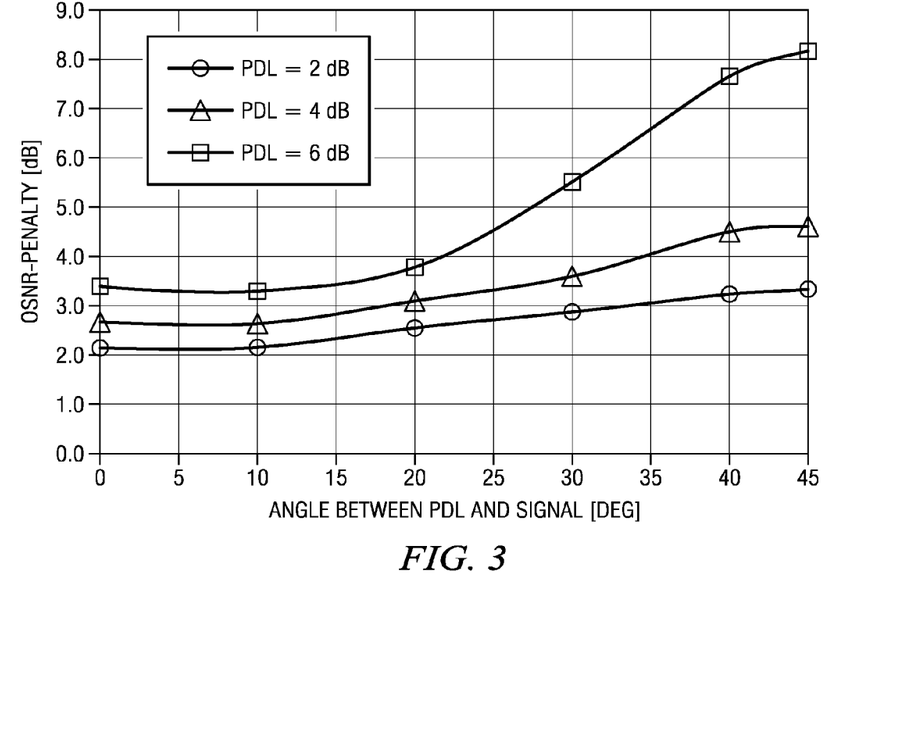
FIG. 3 illustrates the optical signal to noise ratio (OSNR) penalty of signals as the orientation angle between the signals and PDL changes.

FIG. 3 illustrates the OSNR penalty of signals as the orientation angle between the signals and the PDL changes. Additionally, FIG. 3 illustrates the difference in OSNR penalty according to varying magnitudes of PDL experienced by each signal. The orientation angle between the signals and the PDL may correspond with the alignment of the signals and PDL axes with respect to each other. For example, when the signals and PDL are substantially aligned, as depicted in FIG. 2a, the orientation angle between the two may approximately equal zero degrees. As the signals become less aligned with respect to the PDL, the orientation angle between the signals and the PDL increases. When the signals the most unaligned with the PDL, as depicted in FIG. 2b, the orientation angle between the signals and the PDL is forty-five degrees.

From the graph, it can be seen that the OSNR penalty increases as the angle of orientation associated with alignment between the PDL and the signal increases. In the present example, the OSNR penalty stays fairly level when the orientation angle is approximately between zero and fifteen degrees between the PDL and the signal, But, the OSNR penalty then dramatically increases as the orientation angle approaches forty-five degrees. Accordingly, it may be advantageous to detect when the orientation angle of the signal with respect to the PDL begins to affect the OSNR penalty and to appropriately reorient the signal to correct the problem.

Changes may be made to FIG. 3 without departing from the scope of the disclosure. For example, the values for the OSNR penalty, angle between the PDL and signal, and PDL may vary. The specific values used in the present example are merely to depict the general trend of an increased OSNR penalty being associated with orientation of PDL with respect to optical signals.

Figure 4:
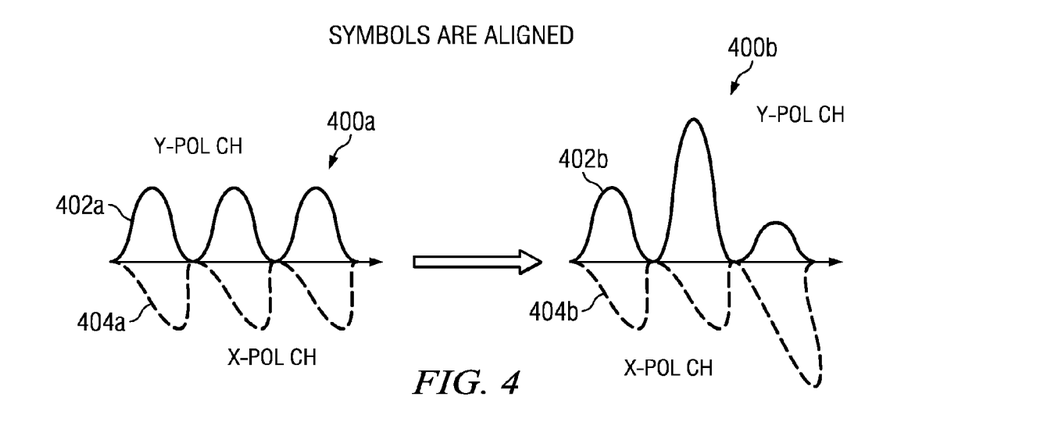
FIG. 4 illustrates the signal cross-talk associated with the PDL and non-linear effects of network elements that causes large optical peak power variations.

FIG. 4 illustrates the signal cross-talk associated with the PDL and non-linear effects of network elements that causes large optical peak power variations. Diagram 400a illustrates a PDM signal having a y-polarization component 402a and an x-polarization component 404a. In the present example, polarization components 402a and 402b are substantially aligned and in phase with each other such that symbols associated with each polarization component are transmitted at the same time. As the PDM signal travels through a network, the PDL effects may introduce cross-talk components that may interfere with the signal. With the main polarization components 402a and 402b substantially aligned the cross-talk components may coincide and interfere with polarization components 402 and 404, which may create undesirable results such as the OSNR penalty depicted in FIG. 3.

Diagram 400b illustrates the interfering effects the cross-talk components may have on a signal. Due to the cross-talk, polarization component 402b may have higher and lower power at different points in time. Similarly, polarization component 404b may have higher and lower power at different points in time due to the interference of cross-talk components. These interfering effects on each polarization component may induce the large optical peak power variations that create the large OSNR penalty. Therefore, it may be advantageous to reduce the interference of the cross-talk components to reduce the peak power variations.

Figure 5:
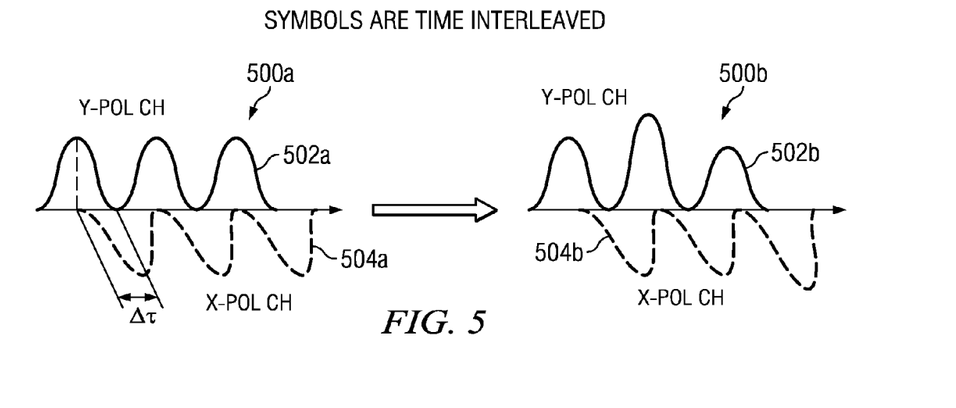
FIG. 5 illustrates a signal where the polarization components are time interleaved to reduce the interference caused by the cross-talk components of the polarization components.

FIG. 5 illustrates a signal where the polarization components are time interleaved to reduce the interference caused by the cross-talk components that coincide with the polarization components. Diagram 500a includes a y-polarization component 502a and an x-polarization component 504a, similar to polarization components 402a and 404a depicted in FIG. 4. However, unlike in FIG. 4, polarization components 502a and 504a may be time interleaved such that the symbols in each polarization are transmitted with a delay between them.

Polarization components 502a and 504a may be time interleaved such that the maximum power level of polarization component 502a corresponds with the minimum power level of polarization component 504a and vice versa. To accomplish the time interleaving, polarization component 502a may be delayed by a factor of $\Delta\tau$ with respect to polarization component 504a.

The value of $\Delta\tau$ may be a function of the symbol period of signal 500a to appropriately interleave polarization components 502a and 504a. The symbol period corresponds with the symbol rate of a signal. To appropriately time interleave the polarization components such that the maximum power levels of polarization component 502a corresponds with the minimum power levels of polarization component 504a the value of $\Delta\tau$ should be approximately half the symbol period of the signal. The symbol period is the inverse of symbol rate $(1/f_s)$ where $f_s$ is the symbol rate. Accordingly, in particular embodiments, $\Delta\tau$ will be $(½)*(1/f_s)$, which equals $(1/(2*f_s))$ and is exactly half of the symbol period.

Diagram 500b depicts the effects of time interleaving with respect to the degree of interference caused by cross-talk components polarization components 502b and 504b. Due to the time interleaving, as the signal propagates through the system, the cross-talk components may appear between the main polarization components 502 and 504 instead of coinciding with them. Therefore, the cross-talk components may interfere less with polarization components 502 and 504. Due to the smaller interference, polarization components 502b and 504b may not experience the large power fluctuations experienced by polarization components 402b and 402c depicted in FIG. 4. Although slight variations in peak power may remain, the variations are reduced in the signal depicted in diagram 500b compared to the variations when time interleaving is not used, as shown by the signal depicted in diagram 400b in FIG. 4. Accordingly, it may be seen that time interleaving of the signals may reduce the large peak-to-peak power variations to reduce the OSNR penalties caused by the peak-to-peak power variations.

Figure 6:
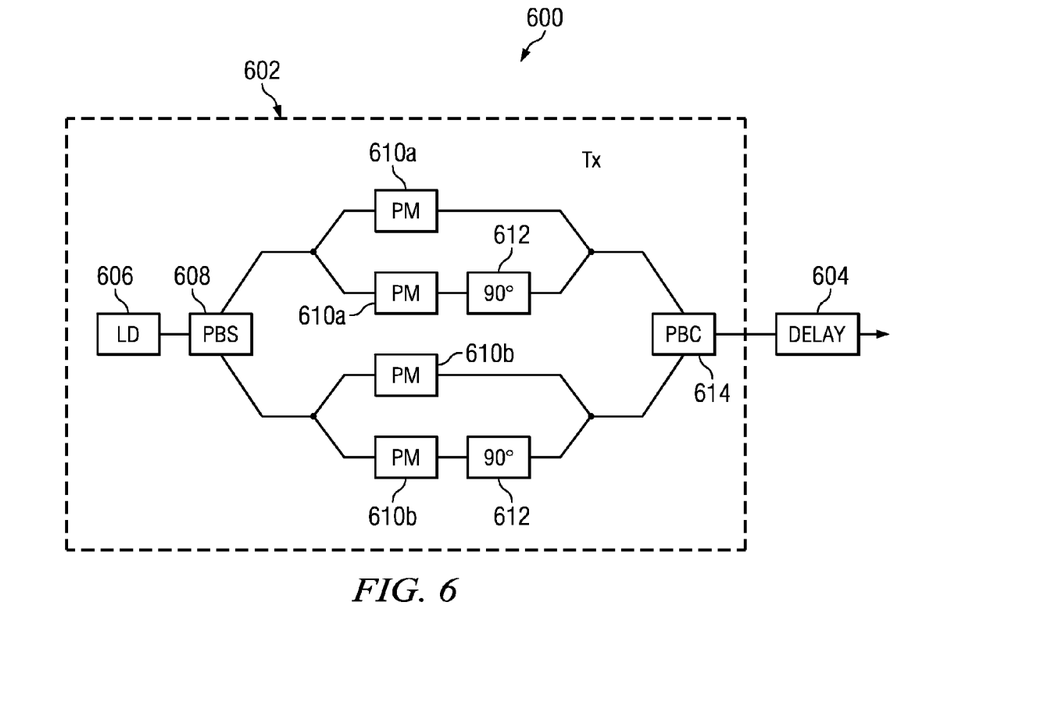
FIG. 6 illustrates an example system for interleaving polarization components of multi-polarization optical signals.

FIG. 6 illustrates an example system 600 for interleaving polarization components of PDM optical signals. System 600 may include a transmitter (Tx) 602 and a delay element 604 optically coupled to the output of transmitter 602.

Transmitter 602 may be any system, apparatus or device configured to receive electrical signals, and modulate the information carried by the electrical signals onto a plurality of polarization states included in an optical wavelength or signal. For example, transmitter 602 may include a laser diode (LD) 606 configured to generate a beam of light at a particular wavelength. Laser diode 606 may be optically coupled to polarization beam splitter (PBS) 608, and may be configured to direct the beams it generates to PBS 608.

PBS 608 may comprise any suitable system, apparatus or device configured to split beams of light according to the polarization components of the beams of light. For example, laser diode 606 may transmit beams towards PBS 608 and PBS 608 may be configured to split the beams according to horizontal and vertical polarization components of the beam (e.g., an x-polarization component and a y-polarization component). PBS 608 may be configured to direct each polarized beam to a plurality of phase modulators (PM) 610. In the present example, PBS 608 may be configured to direct one of the polarized beams to phase modulators 610a and may be configured to direct the other polarized beam to phase modulators 610b.

Phase modulators 610 may comprise any suitable system, apparatus or device configured to modulate information onto the optical waves or beams. Transmitter 602 may also include phase shifters 612 coupled to one or more phase modulators 610 and configured to shift the phase of beams by ninety degrees as part of the modulation, such as used in Quadrature Phase Shift Keying (QPSK).

Following modulation, the x and y polarization beams may be directed to a polarization beam combiner (PBC) 614 optically coupled to phase modulators 610 and phase shifters 612. PBC 614 may comprise any system, apparatus or device configured to combine the x and y polarization beams into a single optical beam that includes an x-polarization component and a y-polarization component. Consequently, the beam leaving PBC 614 may comprise an optical signal with two polarization components (e.g., x and y polarization components) having data or information encoded thereon. In other embodiments, the modulated beams may each be sent to a return to zero (RZ) pulse carver before being sent to PBC 614.

PBC 614 may be configured to direct the combined beam to delay module 604 optically coupled to PBC 614. Delay module 604 may comprise any suitable system, apparatus or device configured to time interleave the modulated polarization components PDM signals.

In the present example, delay module 604 may be configured to time interleave the x-polarization component and the y-polarization components of a PDM signal. In some embodiments, delay module 604 may comprise a piece of high birefringence (HiBi) fiber. The birefringence of the fiber may cause one polarization component (e.g. x-polarization) to travel through the fiber faster than another polarization component (e.g., y-polarization) according to the orientation of the polarization components with respect to the horizontal and vertical axes of a frame of reference. The difference in travel time within the HiBi fiber causes interleaving of the x-polarization component with respect to the y-polarization component. Accordingly, by passing a dual polarization optical signal through the fiber, the modulated x and y polarization components may be time interleaved.

The length of a HiBi fiber necessary to create the proper delay between polarization components may be calculated according to the specific requirements and specifications of the system. The length of the HiBi fiber is a function of the speed of light (c); $\Delta\tau$ (which relates to the symbol period as described above); and the birefringence material of the HiBi fiber, which dictates the differential effective refractive index ($\Delta n$) between the polarization components of a signal. The appropriate length (L) of the HiBi fiber may be calculated using the following equation:

$$L = \Delta\tau * \frac{c}{\Delta n}$$

Therefore, the proper length of a HiBi fiber to act as a delay module 604 may be calculated according to the particular characteristics of the network. Accordingly, by knowing the system characteristics such as bit rate and modulation technique, and the $\Delta n$ for various HiBi materials, the length of a HiBi fiber for time interleaving may be calculated for various types of HiBi fibers and optical networks.

Modifications, additions or omissions may be made to system 600 without departing from the scope of the present disclosure. For example, transmitter 602 may comprise any optical transmitter configured to transmit PDM signals, it need not be limited to a transmitter configured to transmit a dual polarization QPSK (DP-QPSK) signal. Additionally, delay module 604 may be included inside of transmitter 602 instead of right outside of it without departing from the scope of the present disclosure.

Figure 7:
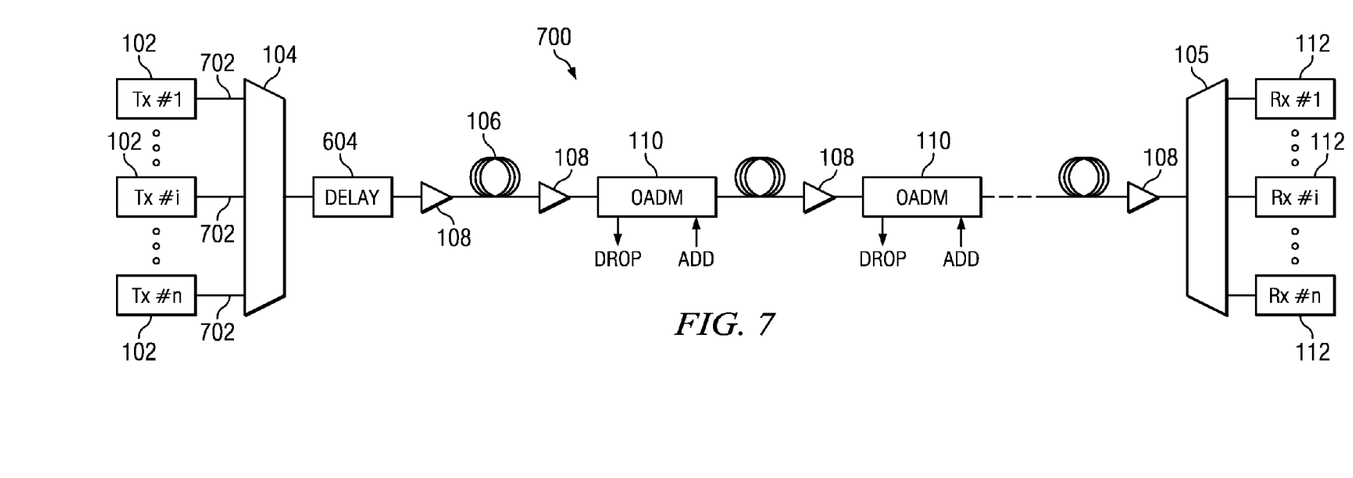
FIG. 7 illustrates another example implementation of a delay module in an optical network.

FIG. 7 illustrates another example implementation of a delay module 604 in an optical network. In the present example, delay module 604 may be implemented in an optical network 700 similar to network 101 described with respect to FIG. 1. Network 700 may be configured to transmit WDM signals throughout the network. If the same configuration disclosed in FIG. 6 were used for a network that includes a WDM signal, the network may include a delay module 604 after each transmitter associated with each channel. However, network 700 depicts an alternative embodiment where a delay module 604 may be used to time interleave all of the channels within a WDM signal at the same time.

Network 700 may be configured such that a delay module 604 may be implemented after the individual channels transmitted by transmitters 102 are combined into a single WDM signal by multiplexer 104. Network 700 may include PDL inducing elements such as amplifiers 108, OADM's 110 and fibers 106. Accordingly, it may be advantageous to implement delay module 604 after the individual channels are combined into a WDM signal, but before the WDM signal reaches the PDL inducing elements.

As mentioned with respect to FIG. 6, delay module 604 may comprise a HiBi fiber configured to delay one polarization component of a signal by $\Delta\tau$ with respect to the other polarization component of the signal. Also, as mentioned above, the value of $\Delta n$ is also used to determine the proper length of a HiBi fiber to achieve the proper delay of $\Delta\tau$. The value of $\Delta n$ is the differential effective refractive index of the x and y polarization components according to their respective orientation with respect to the horizontal and vertical axes of a frame of reference. Therefore, the polarization components of the signals entering a delay module 604 comprising a HiBi fiber may be oriented according to the horizontal and vertical axes used to determine $\Delta n$. Accordingly, in the present embodiment, it may be necessary to maintain the polarization orientation of the signals between when the signals leave transmitters 102 and when the signals reach delay module 604.

In the present embodiment, system 700 may include polarization maintaining fibers 702 between transmitters 102 and multiplexer 104. Additionally, multiplexer 104 may also comprise a polarization maintaining multiplexer. The term "polarization maintaining" may refer to maintaining the orientation of the x and y polarization components of PDM signals.

For example, upon leaving transmitters 102, each channel associated with each transmitter 102 may comprise a x-polarization component oriented with respect to the horizontal axis and a y-polarization component oriented with respect to the vertical axis. Polarization maintaining elements may be configured such that the x-polarization component maintains its orientation and y-polarization component maintains its orientation also. Alternatively, non-polarization maintaining elements may cause the x and y polarizations to rotate such that they each are oriented according to components of both the horizontal and vertical axes.

Therefore, polarization maintaining fibers 702 and polarization maintaining multiplexer 104 may ensure that the x and y polarization components of signals passing through delay module 604 are oriented such that delay module 604 may properly time interleave the x and y polarization components of the signals.

Figure 8:
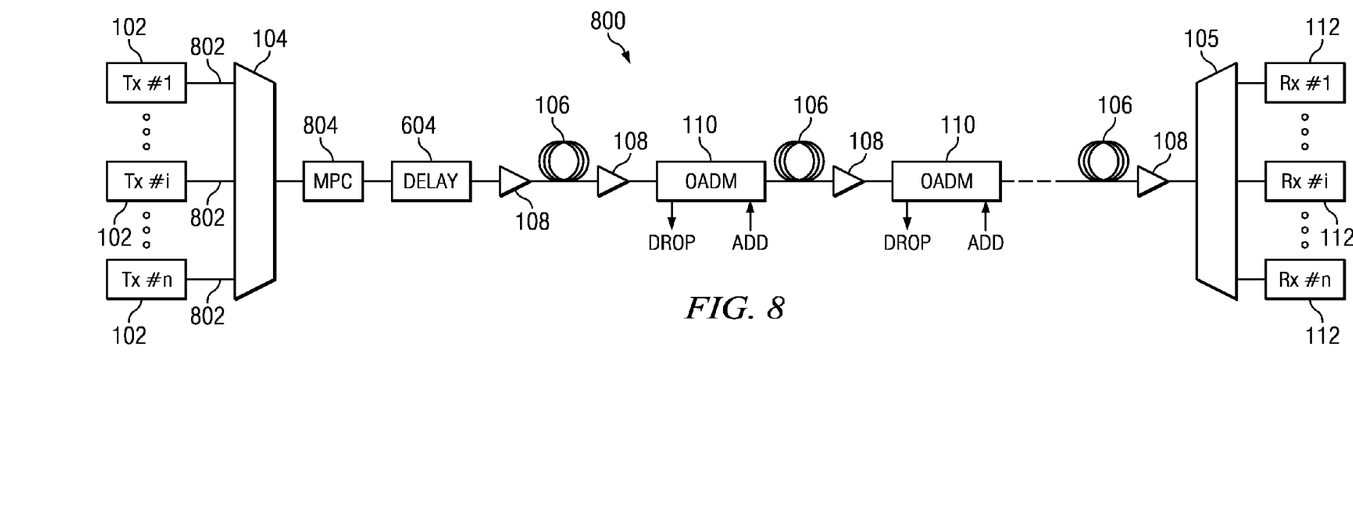
FIG. 8 illustrates yet another example for an implementation of a delay module in an optical network.

FIG. 8 illustrates yet another example for an implementation of a delay module 604 in an optical network 800. In the present example, optical network 800 may be similar to networks 101 and 700 described with respect to FIGS. 1 and 7. However, unlike fibers 702 and multiplexer 104 in network 700, fibers 802 and multiplexer 104 in network 800 may not be polarization maintaining elements. Therefore, upon leaving multiplexer 104, the x and y polarization components of one or more channels within the WDM signal may not be sufficiently aligned with the horizontal and vertical axes and thus delay module 604 may not properly time interleave the x and y polarization components if they are not properly oriented.

Network 800 may include a multi-channel polarization controller (MPC) 804 optically coupled to delay module 604 to ensure that the polarizations of each of the channels of the WDM signals entering delay module 604 are oriented such that delay module 604 may properly time interleave the x and y polarization components of the signal. MPC 804 may comprise any suitable system, apparatus or device configured to independently adjust the polarization of each individual wavelength or channel of a WDM signal.

Figure 9:
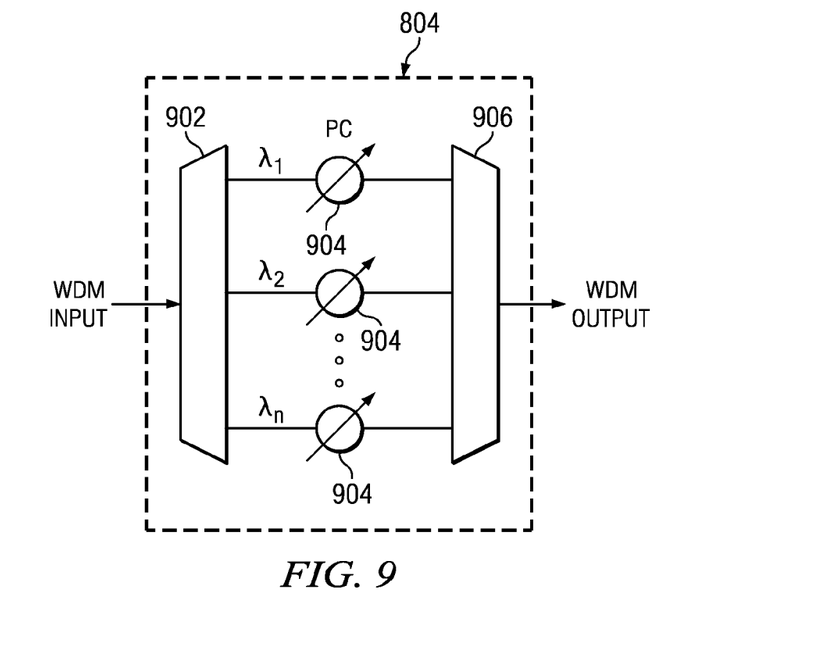
FIG. 9 depicts an example embodiment of a multi-wavelength polarization controller (MPC) configured to adjust the polarization of each individual wavelength or channel of a WDM signal.

FIG. 9 depicts an example embodiment of MPC 804 configured to adjust the polarization of each individual wavelength or channel of a WDM signal. In the present example, MPC 804 may include de-multiplexer 902 optically coupled to one or more polarization controllers (PC) 904. Polarization controllers 904 may also be optically coupled to a multiplexer 906. De-multiplexer 902 may comprise any system, apparatus or device configured to de-multiplex a WDM signal into each of its constituent channels ($\lambda$).

MPC 804 may also include a polarization controller 904 associated with each individual, de-multiplexed channel. Each controller 904 may be configured to determine the polarization orientation of the polarization components of its respective channel. Based on the polarization determination, each controller 904 may adjust the polarization of its respective channel. Each controller 904 may be configured to adjust the polarization such that the x-polarization component of each individual channel is appropriately oriented and that the y-polarization component of each individual channel is appropriately oriented to allow delay module 604 to properly time interleave the x and y polarization components of each channel.

Multiplexer 906 may be coupled to polarization controllers 904 such that following adjustment of each individual channel, multiplexer 906 may be configured to recombine the channels into a single WDM signal with the polarization of each channel adjusted. Accordingly, MPC 804 may be configured to ensure that the x-polarization component of each individual channel is sufficiently aligned with the horizontal axis and that the y-polarization component of each individual channel is sufficiently aligned with the vertical axis such that delay module 604 properly time interleaves the x and y polarization components of each channel within the WDM signal.

Modifications, additions or omissions may be made to MPC 804 without departing from the Although MPC 804 has been described as performing specific operations in a specific manner to adjust the polarization of each channel, any suitable system, apparatus or device configured to adjust the polarization of each channel may be used without departing from the scope of the present disclosure.

Figure 10:
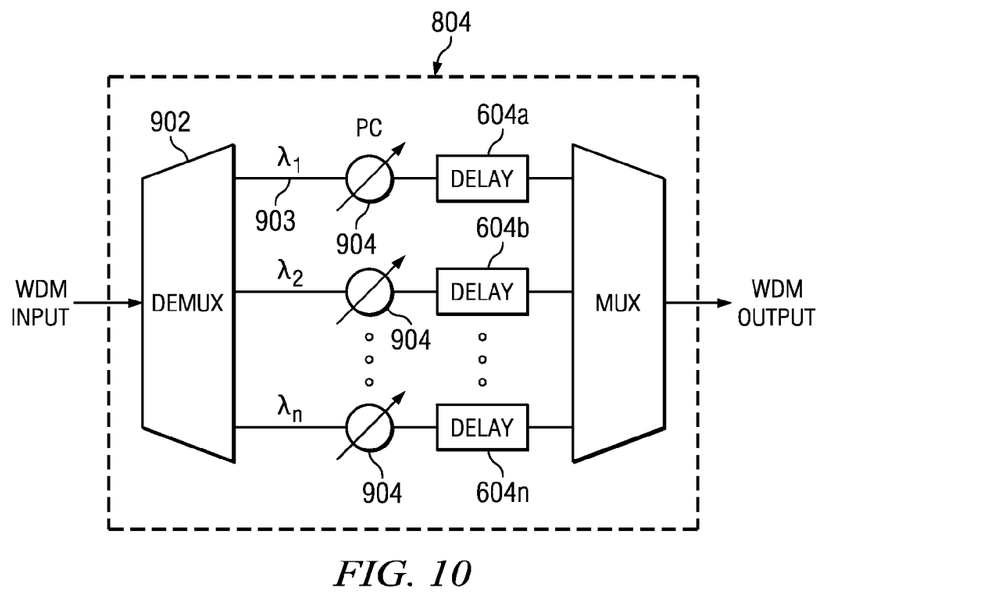
FIG. 10 illustrates another embodiment of an MPC.

FIG. 10 illustrates another embodiment of an MPC 804 similar to MPC 804 described with respect to FIG. 9; however, MPC 804 in FIG. 10 may also include a plurality of delay modules 604 associated with each individual channel. In some WDM applications some channels may have different symbol rates and therefore the value for $\Delta\tau$ may vary depending on each channel. Therefore, a different delay module for each different channel with different symbol rates may be necessary.

For example, in FIG. 10, channel $\lambda_1$ may comprise a 40 Gb/s DP-QPSK signal and channel $\lambda_2$ may comprise a 100 Gb/s DP-QPSK signal. Therefore $\Delta\tau$ for $\lambda_1$ may be approximately 50 ps and $\Delta\tau$ for $\lambda_2$ may be 20 ps. Accordingly, MPC 804 may include a delay module 604a configured to time interleave the x and y polarization components of $\lambda_1$ by 50 ps, such that the x and y polarization components for channel $\lambda_1$ are properly interleaved. Additionally, MPC 804 may include a delay module 604b configured to time interleave the x and y polarization components of $\lambda_2$ by 20 ps, such that the x and y polarization components for channel $\lambda_2$ are properly interleaved also. Accordingly, delay modules 604a and 604b may be differently configured according to the characteristics of their respective channels.

Modifications, additions or omissions may be made to MPC 804 in FIG. 10 without departing from the scope of the present disclosure. For example, instead of using HiBi fibers for delay modules 604, which provide for a fixed delay period, polarization controllers 904 may comprise delay modules 604 that may be configured to adjust the delay, $\Delta\tau$, for each channel in a variable manner, such as a Santec ODL-620 variable delay line.

Figure 11:
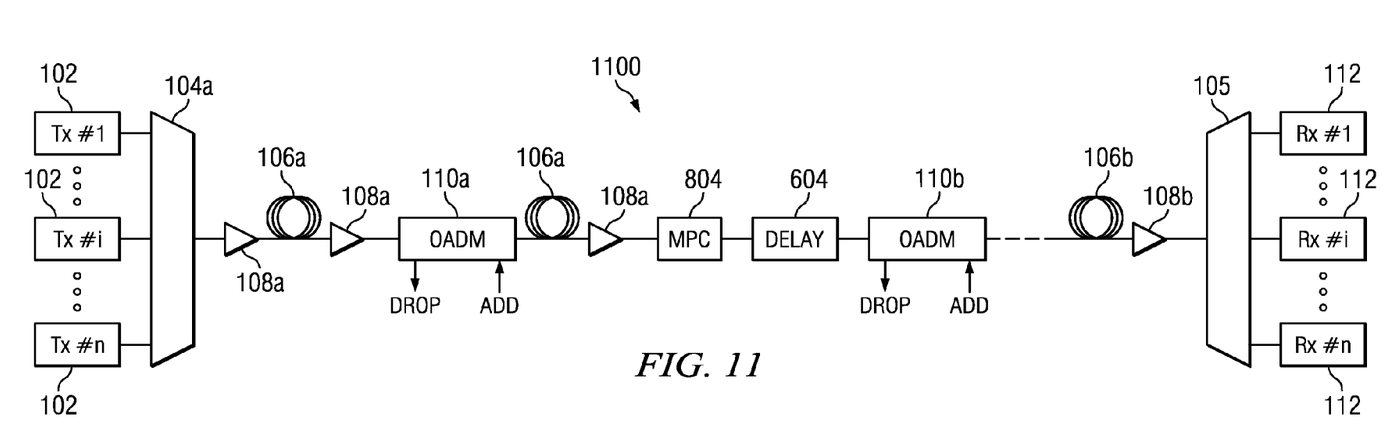
FIG. 11 illustrates another example for implementation of a delay module in an optical network.

FIG. 11 illustrates another example for implementation of a delay module 604 in an optical network 1100. Network 1100 may be similar to networks 101, 700 and 800 but it may comprise some elements with low to negligible PDL and other components with high PDL. In the present example, multiplexer 104a, amplifiers 108a, fibers 106a and OADM 110a may all comprise low PDL elements. Accordingly, these elements may introduce low to negligible PDL effects on the signals that pass through them. Due to the low PDL effects, time interleaving of the singles passing through these elements may be unnecessary. Accordingly, a delay module 604 to time interleave signals before the signals enter these elements may also be unnecessary.

However, network 1100 may also include one or more high PDL elements such as OADMs 110*b*, fibers 106*b* and amplifiers 108*b*. The amount of PDL exerted by these elements may not be negligible; therefore, network 1100 may include a delay module 604 before the high PDL elements to properly time interleave the x and y components of the signals to reduce the PDL effects of the high PDL elements.

Network 1100 may also include a MPC 804 coupled to delay module 604 to ensure the proper orientation of the polarization components of signals entering delay module 604. MPC 804 may be required because the random birefringence of optical fibers induces rotation of the signal's polarization state.

Modifications, additions or omissions may be made to network 1100 without departing from the scope of the present disclosure. For example, MPC 804 and delay module 604 have been depicted as following a certain number of low PDL elements and preceding a certain number of high PDL elements, however the present disclosure should not be limited to such. The present example is merely to show that delay module 604 may be implemented at various locations in a network depending on the network specifications and requirements. For example specific elements within the network may include a delay module 604 and/or an MPC 804 for time interleaving of polarization components of signals.

Figure 12:
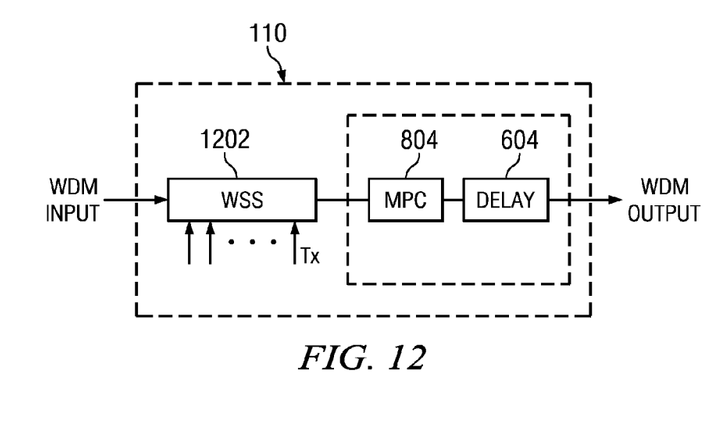
FIG. 12 illustrates an example implementation of a delay module included in an optical add/drop multiplexer (OADM)

FIG. 12 illustrates an example implementation of a delay module 604 included in an OADM module such as an OADM 110. OADM 110 may include a wavelength selective switch (WSS) 1202 configured to add signals to a network. The signals being added to a network may not be time interleaved to reduce the effects of PDL. Therefore, a delay module 604 and an MPC 804 may be included in an OADM 110 and coupled to the WSS 1202 to ensure that the signals added by WSS 1202 are properly interleaved. In an alternative embodiment, delay module 604 and MPC 804 may be included in a network after each OADM 110 to ensure the same result.

Modifications, additions or omissions may be made to FIG. 12 without departing from the scope of the present disclosure. For example, OADM 110 may include any number of WSS's 1202 according to the design and performance requirements of OADM 110.

Figure 13:
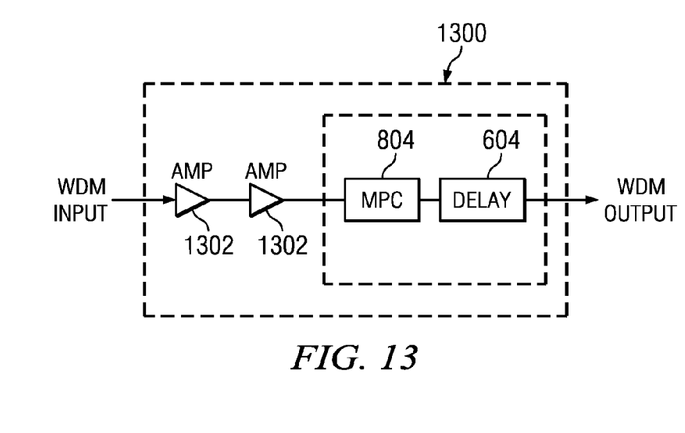
FIG. 13 illustrates an example implementation of a delay module included in an in-line optical amplifier (ILA).

FIG. 13 illustrates an example implementation of a delay module 604 included in an in-line optical amplifier (ILA) module 1300. ILA 1300 may include one or more amplifiers 1302 for manipulating the power of optical signals passing through ILA 1300. In the present example, ILA 1300 includes two amplifiers 1302, however the present disclosure should not be limited to such. ILA 1300 may include more or fewer amplifiers 1302 than the two depicted depending on the characteristics and configurations of ILA 1300. ILA 1300 may also include an MPC 804 and delay module 604 coupled to the amplifiers 1302 and configured to time interleave the signals being amplified by ILA 1300 before the signals leave ILA 1300. Accordingly, ILA 1300 may be configured to time interleave the polarizations of optical signals also.

Modifications, additions or omissions may be made to FIGS. 12 and 13 without departing from the present disclosure. For example, although delay module 604 and MPC 804 are depicted as being included in an OADM 110 and an ILA 1300, delay module 604 and/or MPC 804 may be implemented in any appropriate element of an optical network. The various characteristics and requirements of each network may dictate the placement of a delay module, and the present disclosure should not be limited to the embodiments and characteristics described herein. Additionally, MPC 804 may be unnecessary in instances where the delay module is configured to delay non-WDM signals.

Although the present disclosure and its advantages have been described in detail, it should be understood that various changes, substitutions and alterations can be made herein without departing from the spirit and scope of the disclosure as defined by the following claims.

What is claimed is:

1. A system for reducing polarization dependent loss (PDL) of a wavelength division multiplexed (WDM) optical signal that includes a plurality of channels, the system comprising:
    a multi-wavelength polarization controller (MPC) configured to independently adjust a polarization orientation of each channel of the WDM signal to allow for time interleaving of a first polarization component of each channel with respect to a second polarization component of each channel; and
    a delay module optically coupled to the MPC and to one or more PDL inducing network elements of an optical network, the delay module configured to time interleave the first polarization component with respect to the second polarization component of the each channel to reduce interference caused by cross-talk components associated with the first and second polarization components and induced by the PDL of the PDL inducing elements.

2. The system of claim 1, wherein the optical signal includes a symbol period and wherein the first and second polarization components are time interleaved according to the symbol period.

3. The system of claim 2, wherein the first and second polarization components are time interleaved by approximately half the symbol period.

4. The system of claim 1, further comprising an optical transmitter configured to transmit the optical signal and coupled to the delay module, wherein the delay module is positioned after the transmitter such that the delay module time interleaves the first and second polarization components of the optical signal upon transmission of the signal by the transmitter.

5. The system of claim 1, wherein the MPC includes the delay module and wherein the delay module comprises a plurality of delay modules, wherein each delay module is associated with one of the plurality of channels.

6. The system of claim 1, wherein the optical signal comprises a wavelength division multiplexed (WDM) signal that includes a plurality of channels, wherein the system further comprises:
    a plurality of transmitters each configured to transmit one of the plurality of channels;
    a plurality of polarization maintaining fibers each coupled to one of the plurality of transmitters and configured to carry one of the plurality of channels; and
    a polarization maintaining multiplexer coupled to the plurality of transmitters via the polarization maintaining fibers and configured to combine the plurality of channels into the WDM signal and wherein the delay module is positioned after the multiplexer.

7. The system of claim 1, wherein the delay module comprises a high birefringence (HiBi) fiber.

8. The system of claim 1, wherein the delay module is positioned after a plurality of PDL inducing network elements.

9. The system of claim 1, further comprising an optical add/drop multiplexer (OADM) configured to add and drop optical signals to and from the network and wherein the delay module is positioned in the OADM.

10. The system of claim 1, further comprising an optical amplifier configured to amplify the optical signal and wherein the delay module is optically coupled to the amplifier such that the delay module time interleaves the polarization components of the signal upon the signal being amplified by the amplifier.

11. The system of claim 1, further comprising a plurality of low PDL inducing network elements, wherein the delay module is positioned after the low PDL inducing network elements.

12. A method for reducing polarization dependent loss (PDL) of a wavelength division multiplexed (WDM) optical signal that includes a plurality of channels, the method comprising:

independently adjusting a polarization orientation of each channel of the WDM signal using a multi-wavelength polarization controller to allow for time interleaving of a first polarization component of each channel with respect to a second polarization component of each channel; and delaying, by a delay module, a first polarization component with respect to a second polarization component to time interleave the first polarization component with respect to the second polarization component of each channel to reduce interference caused by cross-talk components associated with the first and second polarization components and induced by the PDL of the PDL inducing elements.

13. The method of claim 12, wherein the optical signal includes a symbol period and further comprising delaying the first and second polarization components according to the symbol period.

14. The method of claim 13, further comprising delaying the first and second polarization components by approximately half the symbol period.

* * * * *